Dec. 28, 1926.
C. H. POLLARD
1,612,648
TROLLEY CONSTRUCTION FOR ELECTRIC CRANES
Filed May 26, 1926
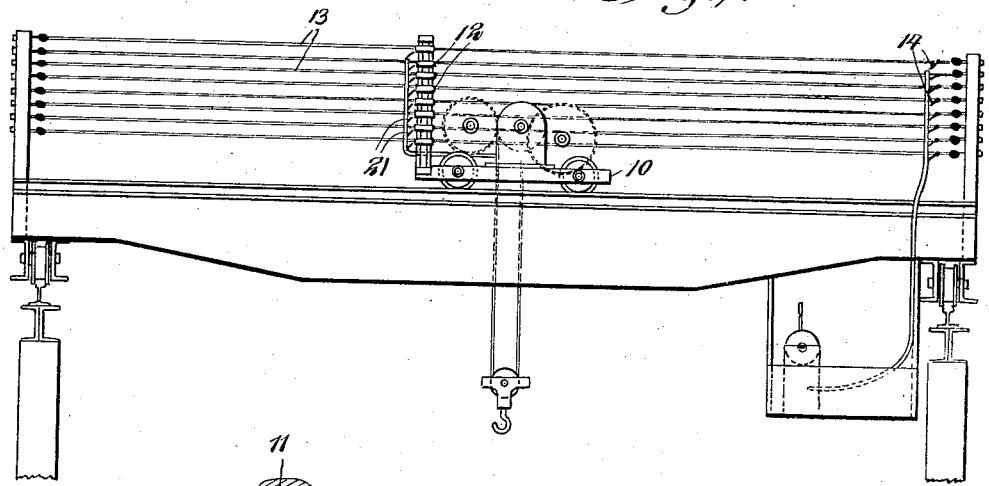
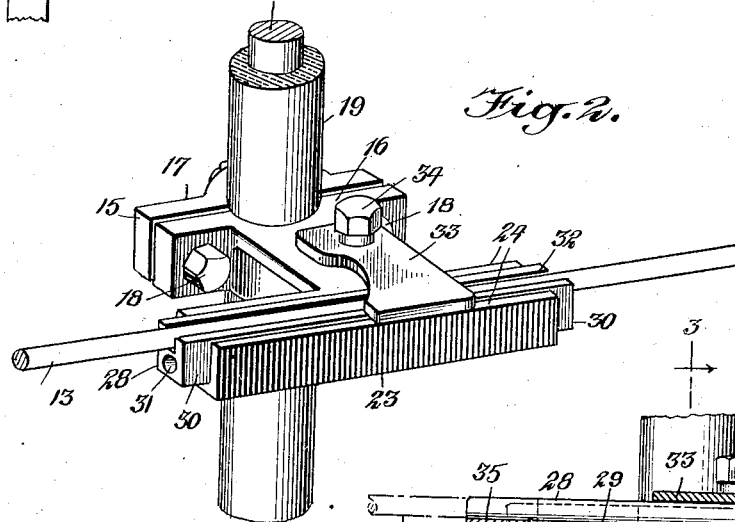
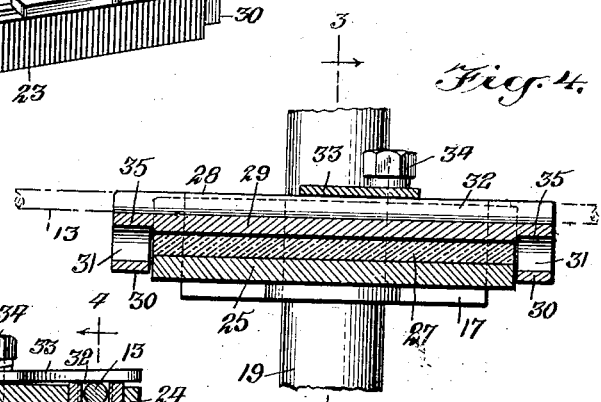
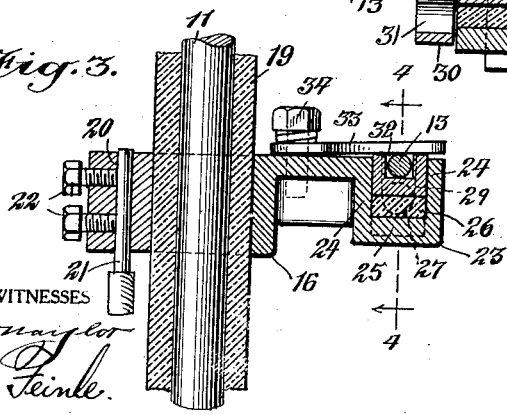
WITNESSES
INVENTOR
C. H. Pollard
BY
ATTORNEYS Patented Dec. 28, 1926.

1,612,648

UNITED STATES PATENT OFFICE.

CHARLES HARVEY POLLARD, OF WHEELERSBURG, OHIO.

TROLLEY CONSTRUCTION FOR ELECTRIC CRANES.

Application filed May 26, 1926. Serial No. 111,802.

Certain types of electric cranes are operated by several electric motors which furnish the power for imparting translatory movement to the crane traveler, and these motors are carried by the traveler. The motors are operated by electrical energy which is sent through trolley wires suitably supported. One trolley wire is electrically connected to each of the phases of its related motor. A trolley carried by the traveler includes slides each of which moves in contact with one of the trolley wires. Up to the present time the type of slide used wears out by constantly sliding back and forth in contact with the trolley wire and as a result the entire slide is scrapped. Furthermore when the old type of trolley slide wears through, parts thereof often fall to the ground and there is great danger of a person being badly hurt if not killed.

It is the principal object of the present invention to overcome all of the disadvantages incident to the use of the type of trolley slides now in use by providing a replaceable wear filler piece which moves in contact with a trolley wire so that when the same wears through from constant sliding back and forth on the wire, the entire slide need not be scrapped but a new wear filler piece may be substituted in lieu of the one worn through.

Another object of the invention is the provision in a trolley of the indicated character of an insulator which supports the replaceable wear filler piece so that when the filler piece is worn through the trolley wire will come in contact with the insulator and thereby open the circuit to one of the phases of the motor and as a consequence stop the motor.

With the foregoing and other objects in view, the invention resides in the particular provision, construction, and functions of the parts hereinafter fully described.

The nature of the invention and its distinguishing features and advantages will appear when the following description is read in conjunction with the accompanying drawing, in which—

Figure 1 is an elevation of an electric crane conventionally shown and embodying a plurality of the trolley slides of the present invention.

Fig. 2 is a perspective view of one of the trolley slides embodying the invention.

Fig. 3 is a sectional view taken on the line 3—3 of Fig. 4.

Fig. 4 is a sectional view taken on the line 4—4 of Fig. 3.

Referring now to the illustration in Fig. 1 it will be noted that there is conventionally shown an electric crane which includes a traveler 10 which supports suitable motors. The traveler supports a trolley pole 11 on which is mounted trolley slides 12 each of which moves in conjunction with a trolley wire 13. Each of the trolley wires 13 receives current from a suitable source of electrical energy through lead wires 14. The current passes from each trolley wire to its related slide 12, and from the slide the current passes to one of the phases of its related motor.

Referring now more particularly to Figs. 2, 3 and 4 for all of the details of the trolley slide of the present invention, it will be apparent that in the illustrated embodiment, the slide includes a clamp 15 comprising two main parts 16 and 17 of conducting material which are held together by suitable clamping bolts 18. The clamp 15 constitutes means for effecting the attachment of the slide. The parts 16 and 17 are clamped about a fiber element 19 which surrounds the pole 11 so that the slide will be electrically insulated from the pole. The part 17 has a hole 20 drilled therein which receives one end of the collector lead wire 21 which is connected to one of the brushes of the motor; the end of the lead wire 21 being secured by screws 22. The part 16 of the clamp is formed with a channel member 23 which provides spaced side portions 24, a connecting portion 25, and a recess 26. An insulator 27 is employed and is preferably made of fiber. The said insulator 27 is arranged in the recess 26 and rests on the connecting portion 25. A replaceable wear filler piece 28 is employed and is made of conducting material. In the present instance the filler piece 28 is formed to provide a channel section 29 and an angularly disposed portion 30 at each end of the section 29, and each portion 30 having a hole 31 therein. The channel section 29 provides a recess or groove 32. The filler piece 28 is arranged in the recess 26 of the channel member 23, and rests on the insulator 27. It is to be noted that the portions 30 of the channel section 29 are disposed in a manner to prevent relative longitudinal movement of the filler piece 28 with respect to the channel member 23. It is also to be noted that the filler piece 28 is in electrical contact with the side portions 24 of the channel member 23. The groove 22 in the filler piece 28 is adapted to receive one of the trolley wires 13 as shown most clearly in Figs. 2 and 3. In order to prevent the filler piece 28 from having upward movement, and to prevent the trolley wire from jumping out of the groove 32, there is provided means in the form of a plate 33 which has one end thereof attached to the parts 16 of the clamp by a stud 34, and its opposite end is disposed over the filler piece and trolley wire as shown most clearly in Figs. 2 and 3. The plate 33 is removable.

The trolley slide of the present invention functions in the following manner: as the slide moves back and forth in the operation of the traveler 10, the filler piece 28 will be in sliding contact with its related trolley wire 13. This contact between the filler piece 28 and the trolley wire subjects the filler piece 28 to wear and in time wears through. The trolley wire not only wears through the connecting portion of the channel section 29 but also wears away the sides of said channel section. The trolley wire wears its way on to the insulator 27 and a bad contact results, and in fact breaks the circuit of one of the phases of the motor thereby stopping the same. It is to be noted that the filler piece 28 will not be cut into two parts because holes provided in the angularly disposed portions 30 respectively will still provide connecting portions even though the portions designated 35 are worn away. It will now be understood that instead of scrapping the entire slide a new filler piece 28 may be placed in the recess 26 after the plate 33 has been removed, and when the new filler piece is in place the said plate 33 may again be secured in place.

It is to be understood that the invention is not restricted to the precise arrangement of parts shown and described, as details of construction may be modified and rearranged without departing from the spirit of the invention, the scope of which is limited only by the terms of the appended claims.

I claim:

1. Means for breaking the circuit of one of the phases of an electric motor of an electric crane to stop the crane, which comprises a slide electrically connected in said circuit, a trolley wire electrically connected in said circuit, a replaceable wear piece of conducting material carried by said slide in electrical contact therewith, said wear piece being in sliding engagement with said trolley wire, and an insulator carried by the slide beneath the wear piece, the trolley wire moving in contact with said insulator when the wear piece is worn through thereby breaking the circuit.

2. Means for breaking the circuit of one of the phases of an electric motor of an electric crane to stop the crane, which comprises a slide electrically connected in said circuit, a trolley wire electrically connected in said circuit, a replaceable wear piece of conducting material carried by said slide in electrical contact therewith, said wear piece having a groove therein in which the trolley wire is disposed, said wear piece being in sliding engagement with said trolley wire, means preventing the trolley wire from leaving said groove, and an insulator carried by the slide beneath the wear piece, the trolley wire moving in contact with said insulator when the wear piece is worn through thereby breaking the circuit.

3. The combination in a trolley construction for electric cranes, of a trolley wire, a slide carried by a support on the crane traveler, a wear filler piece of conducting material carried by the slide, said wear filler piece having a groove in which the trolley wire is disposed and in contact with which the wear filler piece slides, and an insulator carried by said slide beneath said wear filler piece.

4. The combination in a trolley construction for electric cranes, of a trolley wire, a slide including clamping means for effecting the attachment of the slide to a support carried by the crane traveler, said slide having a recess in a portion thereof, an insulator arranged in the recess, a wear filler piece of contacting material arranged in the recess and supported by said insulator, said wear filler piece having a groove therein, said trolley wire disposed in said groove, the wear filler piece in sliding engagement with said trolley wire, means holding the trolley wire disposed in the groove and permitting the sliding movement of the wear filler piece on the trolley wire.

5. The combination in a trolley construction for electric cranes, of a trolley wire, a slide carried by a support on the crane traveler, a wear filler piece of conducting material carried by the slide, said wear filler piece having a groove in which the trolley wire is disposed and in contact with which the wear filler piece slides, an insulator carried by said slide beneath said wear filler piece, and means detachably holding the wear filler piece in place on the slide.

6. The combination in a trolley construction for electric cranes, of a trolley wire, a slide carried by a support on the crane traveler, a wear filler piece of conducting material carried by the slide, said wear filler piece having a groove in which the trolley wire is disposed and in contact with which the wear filler piece slides, an insulator carried by said slide beneath said wear filler piece, and means on the wear filler piece releasably holding the same against longitudinal movement with respect to the slide.

7. The combination in a trolley construction for electric cranes, of a trolley wire, a slide carried by a support on the crane traveler, a wear filler piece of conducting material carried by the slide, said wear filler piece having a groove in which the trolley wire is disposed and in contact with which the wear filler piece slides, an insulator carried by said slide beneath said wear filler piece, and means on the slide releasably holding the wear filler piece against upward movement.

8. The combination in a trolley construction for electric cranes, of a trolley wire, a slide carried by a support on the crane traveler, a wear filler piece of conducting material carried by the slide, said wear filler piece having a groove in which the trolley wire is disposed and in contact with which the wear filler piece slides, an insulator carried by said slide beneath said wear filler piece, means on the wear filler piece releasably holding the same against longitudinal movement with respect to the slide, and means on the slide releasably holding the wear filler piece against upward movement.

9. An electric trolley wire slide of the class described, comprising a holder of conducting material, attaching means for the holder, a separate insulator carried by the holder, a wear piece of conducting material arranged on the insulator and in electrical contact with said holder and adapted to slide in contact with a trolley wire, and means releasably holding the wear piece in place on the holder.

10. An electric trolley wire slide of the class described comprising a holder body of conducting material, attaching means for the holder, a separate insulator arranged in a recess in said holder, a wear piece of conducting material arranged in said recess resting on said insulator and in electrical contact with said holder, said wear piece having a groove therein for the reception of a trolley wire and allowing the wear piece to slide in contact with said trolley wire, and means releasably holding the insulator and the wear piece in place in said recess.

CHARLES HARVEY POLLARD.